Figure 3:
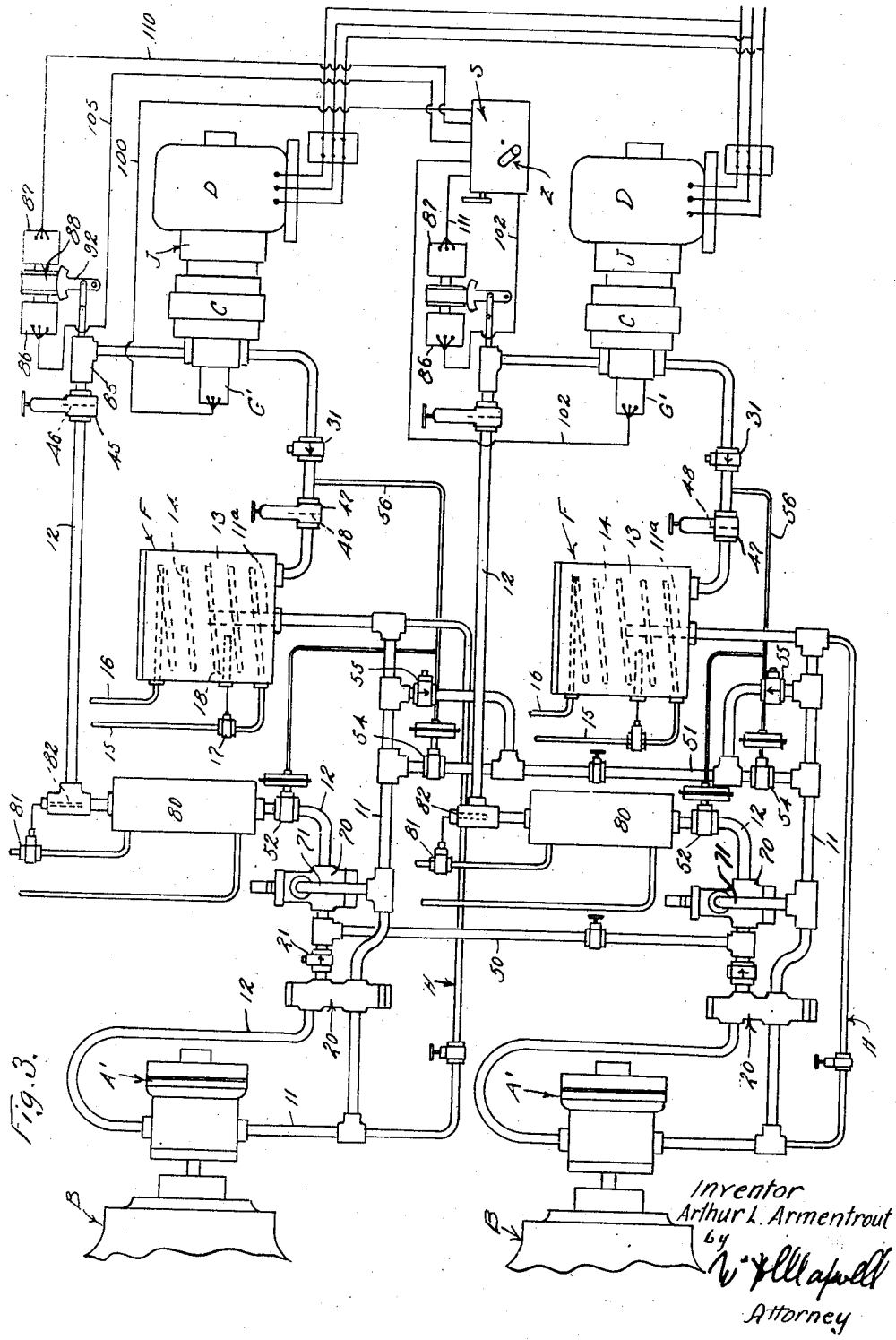

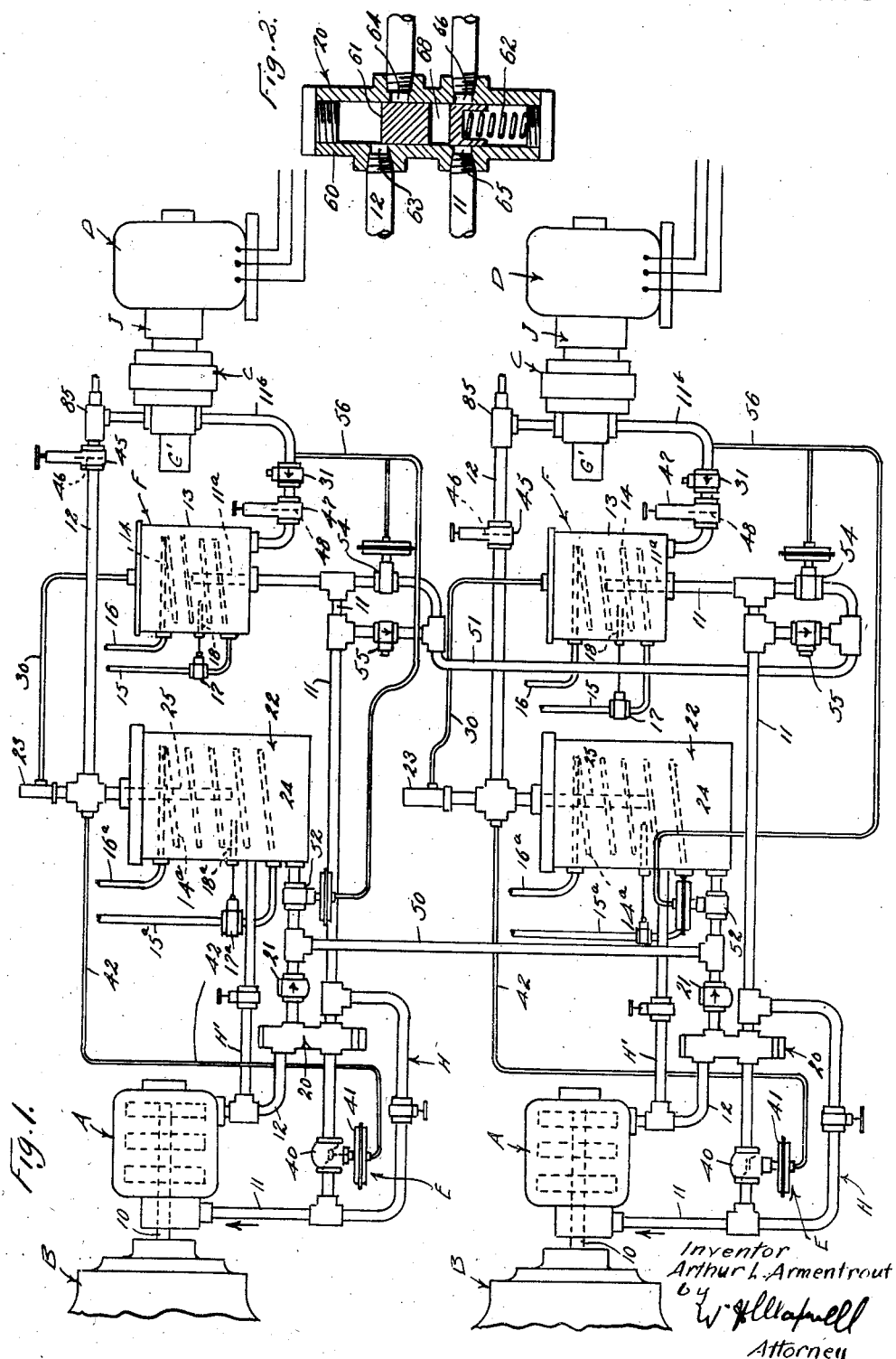

May 23, 1944.  A. L. ARMENTROUT  2,349,334
DRIVE FOR ELECTRIC GENERATORS
Filed Sept. 23, 1942  3 Sheets—Sheet 2

Inventor
Arthur L. Armentrout
by
Attorney

May 23, 1944.  A. L. ARMENTROUT  2,349,334
DRIVE FOR ELECTRIC GENERATORS
Filed Sept. 23, 1942  3 Sheets-Sheet 3
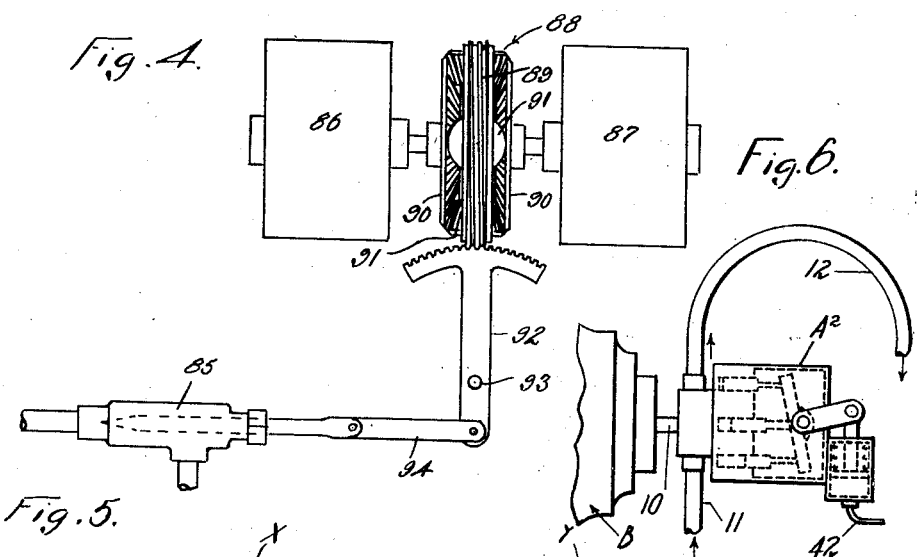
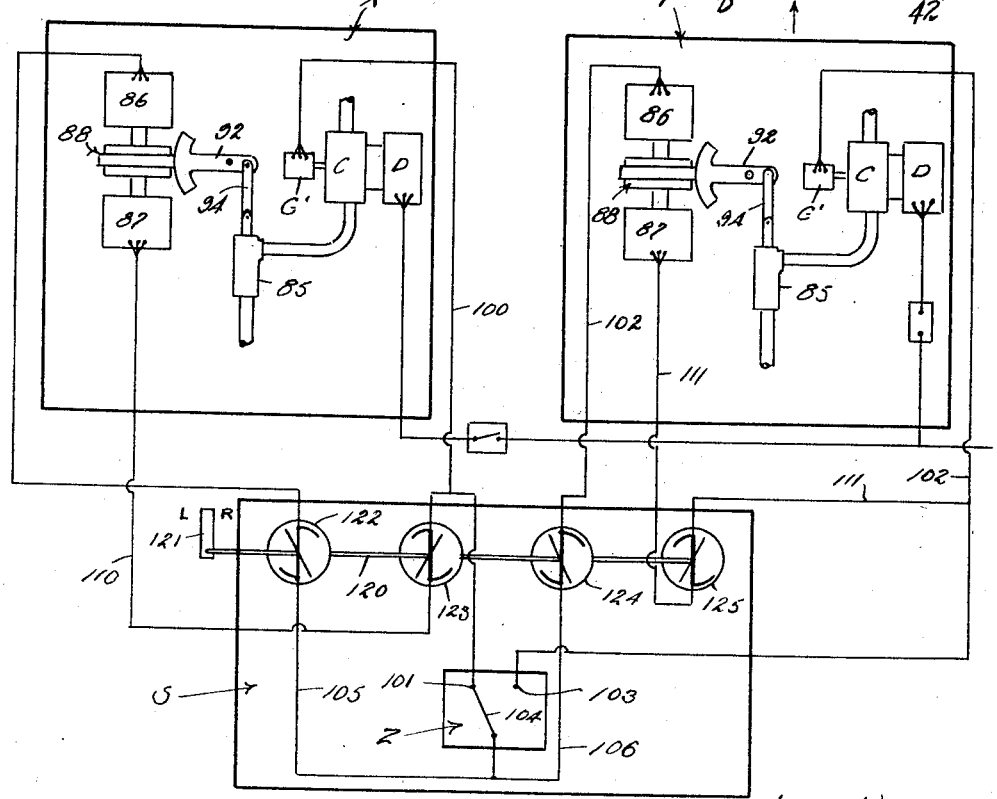
Inventor
Arthur L. Armentrout
by
/s/ Attorney Patented May 23, 1944

2,349,334

UNITED STATES PATENT OFFICE 2,349,334

DRIVE FOR ELECTRIC GENERATORS

Arthur L. Armentrout, Long Beach, Calif.

Application September 23, 1942, Serial No. 459,414

14 Claims. (Cl. 290—4)

This invention has to do with a drive for electric generators and relates more particularly to a generator drive for aircraft. A general object of the present invention is to provide a simple, practical and dependable drive suitable for the generation of alternating current from the engine or engines of an aircraft.

It is common practice in aircraft and particularly military aircraft to employ direct current electrical systems and to generate the electricity by means of generators driven directly from the engine or engines of the aircraft. Such systems involve heavy conductors and have certain characteristics that are not altogether desirable in aircraft.

It is desirable in aircraft, and particularly in military aircraft, if alternating current is employed, to have such current at a predetermined cycle. Heretofore this has presented certain practical difficulties since the engines of the aircraft depended upon for power are not operated at constant speeds but in practice may vary widely in their speeds of operation and they usually vary in speed between one engine and another. With the usual drive connections between such engines and alternating current generators the alternating current would vary widely as to cycle.

It is an object of this invention to provide an effective practical alternating current system for aircraft employing the engine or engines of the aircraft as the prime mover or source of power to generate electrical energy at a remote point or points. By the invention the drive of the generator or generators is through fluid making it possible to locate the generators most advantageously either from the standpoint of weight distribution or proximity to the electrical units to be driven, or both.

Another object of this invention is to provide a drive from a variable speed engine such as is employed to propel an aircraft to a generator whereby the generator is operated to develop alternating current at a predetermined cycle regardless of the speed at which the engine is operated.

It is another object of this invention to provide two or more drives of the character described which normally operate independently of each other but which are interconnected to supplement each other in case of emergency.

It is another object of the present invention to provide interconnected electrical generating units of the character described which have safety elements incorporated in them which minimize the danger of breakdown due to damage or injury to the various elements of the units.

Another object of the invention is to provide a drive of the character described in which there is a final delicate throttle control for the prime movers operating to supplement the general control system so that the speed regulation is precise.

A further object of the invention is to provide a final throttle control that involves an alternating current circuit energized by the generator being driven.

The various objects and features of the invention will be best and more fully understood from the following detailed description of typical manners of carrying out the invention, throughout which description I make reference to the accompanying drawings, in which:

Fig. 1 is a schematic or diagrammatic view illustrating a typical embodiment of the invention employing two electrical generating units interconnected in accordance with the invention to supplement each other. Fig. 2 is an enlarged detailed sectional view of one of the parts entering into the generating unit provided by the invention. Fig. 3 is a diagrammatic view similar to Fig. 1 illustrating another form of the present invention. Fig. 4 is an enlarged diagrammatic view illustrating a differential arrangement that may be employed in the mechanical parts of the throttle control. Fig. 5 is a simplified diagram illustrating the circuit of the throttle control system provided by the invention. Fig. 6 is a view showing another form of pressure generator that can be used in carrying out my invention.

The present invention is primarily concerned with the provision of a practical means of generating alternating current of a predetermined cycle from a variable speed prime mover. The invention is particularly important as applied to aircraft since in such craft the practical available source or sources of power are the engine or engines of the craft which operate at widely different speeds under different conditions, whereas an alternating current electrical system is desirable in such craft but must, in practice, be of constant cycle.

The present invention in its simpler form provides a drive between a prime mover such as an aircraft engine and an electrical generator such as an alternating current generator which drive is through fluid under pressure enabling the generator to be located wherever desired with relation to the engine or the craft, and also automatically operates to compensate for variations in engine speed so that the generator is always operated at a uniform speed.

The invention further contemplates the employment of two or more such generating units interconnected so that they supplement one another in a manner to prevent failure of the source of electrical energy in the event that one engine should become disabled, and also to protect against unexpected breakdown in the units such as might cause one damaged unit to render the connected unit which is undamaged inoperative. The invention further provides a throttle control that effects a final synchronizing regulation of the engines so that the generators all operate at exactly the same speed. This control is through alternating current generated by the system.

In the drawings Fig. 1 illustrates two generating units interconnected in accordance with the present invention. It is to be understood of course that these two units may be located close together or may be remote from one another. Because of the manner in which the two units are illustrated I will refer to them as the upper and lower units, the upper unit being the one shown uppermost in Fig. 1 and the lower unit being the one shown at the bottom of Fig. 1.

A unit embodying the invention includes, generally, a pressure generator or fluid pressure pump A operated by an engine or other suitable prime mover B, a motor C driven by pressure from the pressure generator A and having driving connection with an electrical power generator D, and means E for regulating the fluid supplied to the motor C so a constant pressure is kept on the motor C whereby it is operated at a constant speed. The invention further provides a fluid supply means F which serves to keep the unit supplied with fluid at a substantially constant temperature so that there is no variation in performance due to a change in viscosity of the fluid used in the system. Further the unit includes an overrunning clutch J in the connection between the motor C and generator D, a manually controlled by-pass means H which cuts out the automatic controls to facilitate starting.

In Fig. 1 of the drawings I have illustrated the unit provided by the invention as involving a pressure generator A directly coupled to or driven by the engine B of an aircraft. I have shown but a fragment of the aircraft engine B and I have shown the generator A operated by a shaft 10 from the engine. In the particular form of the invention under consideration the pressure generator A is of a type in which the output may be effectively regulated by controlling the supply of fluid to the generator. I have illustrated diagrammatically a multiple stage centrifugal pump as the pressure generator. The pump A receives the fluid from a supply line 11 and delivers it to a pressure line 12.

The supply line 11 connects the intake of the pump A with the fluid supply means F. The fluid supply means may, in accordance with the principles of the invention, be of any desired form or type and may be located wherever desired in the craft. In the diagram I have shown the supply means as including a container 13 for carrying a body or supply of fluid for the unit. In practice the fluid employed will ordinarily be oil and, therefore, for sake of reference I will refer to the fluid as being oil, it being understood of course that any suitable fluid may be employed without departing from the spirit of the invention.

The supply pipe 11 is related to the container 13 so that fluid from the container will be fed to the supply pipe regardless of the position in which the container may be located. Aircraft are commonly maneuvered through various positions requiring that the operating units contained therein must operate at various angles or even in completely reversed positions. It is contemplated that the container 13 will at all times be more than half filled with fluid and the supply pipe 11 is provided with an extension 11ᵃ within the container extending to the center thereof so that regardless of the position of the container oil will always feed into the supply pipe.

The fluid supply means F includes a means for conditioning the oil so that it is always at a constant temperature. In practice the means provided for regulating the temperature of the oil may be incorporated in various parts of the unit. However, for most practical purposes it may be incorporated in or at the container 13 as indicated in the diagram in Fig. 1. In this case a coil 14 is provided in the container 13 designed to carry a medium for heating or cooling the oil in the container 13, as circumstances require. The coil 14 is supplied with the thermal medium through a supply pipe 15 and a suitable discharge 16 is provided to conduct the medium away from the coil. A regulating valve 17 is provided in the supply pipe 15 under control of a thermostat 18 so that the rate of flow of the thermal medium through the coil 14 is governed by the temperature of the oil in the container 13. It will be understood, of course, that the thermal medium circulated through the coil may be either such as to heat the oil or cool the oil as circumstances require, and such medium may be generated in any desired manner or may be taken from other units of the craft.

The delivery or pressure line 12 extends from the outlet or delivery of the pump A to the motor C. However, in accordance with the invention various elements or units or equipment are connected in the pressure line as will be hereinafter described. These elements may be referred to generally as a cut-off means 20, a check valve 21, a control valve 52, an accumulator 22, a safety valve 23, and a throttle valve 35.

The cut-off means 20 and control valve 52 are employed when several units are interconnected. There is a cut-off means 20 for each unit which acts as I will hereinafter describe to cut off the fluid connections at the pressure generator in the event that the pressure generator or the motor should be disabled or cease operation. The check valve 21 is located between the pressure generator A and the accumulator 22 and acts to allow flow of oil through the pressure line 12 only away from the generator A.

The accumulator 22 which may be located at any convenient point in the craft is in the nature of a container 24 designed to carry a suitable body of oil and a suitable quantity of entrapped gas or air. In the arrangement illustrated the container 24 of the accumulator is connected in the pressure line 12 so that the line enters at the bottom of the container and passes out through the top of the container. An extension 25 of the outgoing portion of the pressure line projects into the container 24 to approximately the center thereof so that the outgoing pressure line is supplied with oil regardless of the positioning of the container 24.

The pressure line 12 extending from the accumulator 22 is connected to the motor C so that the fluid under pressure in the accumulator passes directly from the accumulator to the motor through controls 45 and 85. In accordance with the invention it is of prime importance to have a constant pressure on the oil in the pressure line from the accumulator to the motor C. Various means may be employed to accomplish this. In the case illustrated it is contemplated that the unit be adjusted or set to operate so that pressure is supplied by the pump A to always be slightly above the pressure desired at the motor C. The accumulator 24 absorbs any surge or fluctuation in pressure incidental to the regulation of the generator pressure accomplished through the means E. Stabilized pressure supplied to the motor C assures constant operation of the motor. The pressure in the accumulator 22 being slightly above that desired at the motor C a safety or pressure relief valve 23 is provided in the pressure line from the accumulator to the motor to let off excess pressure returning the oil thus bled from the pressure line through a suitable connection 30 to the container 13 of the means F. The valve 23 not only acts as a safety device to prevent excess pressure from developing in the system but also acts as a means for stabilizing the pressure supplied for the motor C.

The motor C is a fluid motor of a positive type designed to be operated by a fluid such as oil. In practice any one of several well known forms or styles of fluid motor may be employed as the motor C. It may be a vane type motor, a gear type or a cylinder and piston type. It is preferred that the motor C drive the generator D through an overrunning clutch J so that the generator may run ahead of the motor. The assembly formed by the motor C and generator D and clutch J may be located at any desired point in the aircraft. For instance, this assembly may be located in a manner to place the weight thereof in the most advantageous manner, or it may be located to minimize electrical wiring that may be hazardous or it may be located so that the electricity is generated in close proximity to the points at which it is used.

The oil after having passed through the motor C is discharged therefrom through a return line 11ᵇ which conducts it to the container 13 of the means F. It is preferred to include the check valve 31 in the line 11ᵇ which operates to allow the oil to pass freely from the motor C into the container 13 but prevents reverse flow.

The means E for regulating the fluid functions so that fluid at a predetermined pressure and in a predetermined volume reaches the motor to operate it at a certain speed. When a multiple stage centrifugal pump is used as the pressure generator A the control means E includes a control valve 40 in the supply line 11 adjacent the intake of the pump A and suitable means for regulating the valve 40. In the case illustrated the valve 40 is under control of a diaphragm mechanism 41 actuated by pressure from the pressure line 12 leading from the accumulator 22 to the throttle valve 85. A suitable pressure connection 42 extends from the said pressure line 12 to the diaphragm 41 so that the position of the valve 40 is varied with the pressure at the outlet from the accumulator.

The means E thus far described will supply a predetermined quantity of oil to the supply line 12. To stabilize the speed of operation of the motor C I provide means for regulating the quantity and pressure of the oil delivered to the motor. This means includes a volume control in connection with the pressure control and a throttling system hereinafter described. The volume control may comprise an orifice fitting 45 located immediately ahead of the throttle valve 85, the fitting being provided with an orifice plate 46 having an aperture to pass the desired amount of fluid at the pressure established as hereinabove described.

In practice it may be desired to control the temperature of the oil in the accumulator 22 in addition to or in place of controlling it in the reservoir 13. In the drawings I have indicated a thermal coil 14ª in the accumulator connected with conduits 15ª and 16ª for handling the thermal medium, either a heating or cooling medium, under control of a valve 17ª regulated by a thermostat 18ª in the accumulator.

To assure proper operation of the interconnecting means hereinafter described and to assure uniform operation of the motor C I prefer to keep a uniform back pressure in the discharge 11ᵇ from the motor C. This may be done by providing a suitable orifice fitting 47 in the outlet 11ᵇ which fitting may be provided with an orifice plate 48 having an aperture such as to maintain a uniform back pressure in the motor. With this arrangement, that is, by providing an orifice fitting 47, the reservoir or supply means may be open to atmospheric pressure or may be closed and subject to some pressure, as circumstances require.

The operation of the unit thus far described will be apparent from the drawings. The aircraft engine B drives the pressure generator A which is supplied with oil under control of the regulating valve 40. The oil under pressure delivered by the generator A passes the check valve 21, enters the accumulator 22 and is delivered from the accumulator to the pressure line 12 extending from the accumulator to the motor C. The safety valve 23 relieves any excess pressure, by passing any excess oil through connection 30 to the supply means F. The orifice fitting 45 controls the volume of oil passed to the motor and the throttle valve 85, the operation of which is described later, is provided for final regulation. The oil delivered under pressure to the motor C drives the motor which in turn drives the generator D through the overrunning clutch J. The motor generator set C D operates at a constant speed so that the generator D which is an alternating current generator delivers alternating current at a constant predetermined cycle. The oil discharged after passing through the motor C passes the check valve 31 and the orifice fitting 47 and enters the means F where it is established at a proper temperature and returned to the pressure generator A through the supply line 11.

The present invention contemplates the interconnection of two or more units such as I have just described so that the units supplement each other and so that the generators of several connected units operate at exactly the same speed. In Fig. 1 of the drawings I have illustrated a simple fluid pressure interconnection of two units which under normal circumstances operate as individual units. This interconnection serves to connect the units so that one may assist the other.

An electrical interconnection is provided to effect accurate speed regulation.

The hydraulic interconnection contemplated by the present invention comprises primarily a cross connection 50 between the pressure supply lines 12 from the two pressure generators A, a cross connection 51 between the supply lines 11, control valves 52 in the pressure line 12, control valves 54 and check valves 55 in the connection 51 and suitable interconnections between the valves 52, 54 and 55 and the various parts of the two units, all of which will be hereinafter described. The interconnection also contemplates a cut-off means 20 in each of the units.

The cross-connection 50 between the pressure supply lines 12 provides free communication between the pressure supply lines of the connected units so that if for any reason one pressure generator should drop slightly below its proper capacity the other generator may make up the deficiency, for instance, it may happen that one engine B of an aircraft would for a time be operating at a speed less than would cause the proper generation of fluid pressure, whereas the other may be operating at a speed sufficient to deliver an excess.

In the arrangement illustrated the valve 52 is in the pressure line 12 between the point of connection of that line with the cross-connection 50 and the accumulator. The valve 54 for the upper unit is located in connection 51 adjacent the upper unit while the check valve 55 is located in a by-pass around the valve 54 and allows flow only into the cross-connection 51. Valves 52 and 54 are diaphragm controlled valves.

The valve 52 is normally held open by the back pressure in the discharge line 11$^b$. This pressure is communicated from the discharge line 11$^b$ to the valve 52 through a suitable pressure connection 56. If the motor C fails to function and thus maintain the proper back pressure in the discharge 11$^b$ the valve 52 will close so fluid under pressure is not delivered to the disabled motor to be dissipated or to possibly cause damage.

The valve 54 (referring now only to the upper unit) is normally held open by pressure from the discharge 11$^b$, the diaphragm of valve 54 being actuated by the back pressure supplied through connections 56. The valve 54 is normally held open but should the back pressure fail due to failure or improper functioning of the motor C the valve 54 will close thus disconnecting the fluid supplies of the two units. The check valve 55 in the by-pass around the valve 54 serves, however, to allow fluid to pass from the upper unit to the lower unit even though the upper unit may be disabled. It checks flow in the other direction, however, and thus prevents fluid from being wasted from the lower unit in the event that the upper unit is not functioning properly. The corresponding control valves 52, 54 and 55, in connection with the lower unit function the same as such parts in connection with the upper unit, so that the lower unit is disconnected in the event its elements become disabled.

The cut-off means 20 provided in connection with each of the units is designed as a safety element so that the pressure generator A of a unit will not draw oil from the system unless it is properly functioning to generate pressure and deliver oil to the system. This cut-off is shown in simple form in Fig. 2 of the drawings as including a cylinder 60 carrying a plunger valve 61 normally urged upwardly by a spring 62. When the plunger valve 61 is up ports 63 and 64 at opposite sides of the cylinder are cut off. These ports are designed to carry the fluid pressure between the parts of the pressure supply line 12. Likewise, when the plunger valve 61 is up, opposite ports 65 and 66 are cut off, these ports being designed to conduct the supply fluid between the two parts of the supply line 11. As the pressure generator A goes into operation pressure immediately develops above the plunger valve 61, having entered above the valve through the port 63. This pressure overcomes that of the spring 32 and forces the plunger 61 downwardly uncovering the port 64 and causing the port 68 in the plunger valve 61 to register with the ports 65 and 66. Through this device when the generator A is putting out oil under pressure, oil is allowed to enter the generator through the supply line 11. However, should the generator fail to deliver pressure the spring 62 moves the plunger valve 61 to the up position where the supply of oil is cut off. By this device I eliminate the danger of the pressure generator A becoming disabled so that it does not properly supply pressure but draws oil from the system, thus depleting the supply.

Manually controlled by-passes H and H' are provided around the automatic controls of each unit so that free flow of fluid is allowed as the system starts operation. As soon as the system is in operation a back pressure develops and the valves 52 and 54 will be held open so the by-passes can be closed.

The electrical interconnection provided between the two units is for the purpose of delicately balancing the operations of the units so that the two power generators D will operate at exactly the same speed. This electrical interconnection is a throttling control and involves both electrical and mechanical elements. The application of the electrical control to the hydraulic system is shown in Fig. 3. It will be apparent that the electric control applies to the system shown in Fig. 1 in the manner shown in Fig. 3 and as I will now describe. The electric circuit is shown in Fig. 5.

A throttle valve 85 of suitable design, say, for instance, a needle valve, is provided in the pressure line immediately ahead of each motor C. Each throttle valve is under control of two synchronous motors 86 and 87 connected through a differential mechanism 88 (see Fig. 4). The synchronous motors 86 and 87 are connected as hereinafter described to A. C. control generators G' driven directly by the motors C. The motors 86—87 normally operate at the same speed but in opposite directions, so that the floating element 89 of the differential mechanism is normally stationary.

The differential mechanism illustrated in Fig. 4 includes driving pinions 90 directly driven by the motors 86 and 87 and arranged concentrically and in opposed relation in the manner common to differential mechanisms. Planetary gears 91 are carried by the floating element 89 so that they mesh with the pinions 90. When the pinions 90 are driven at exactly the same speed the planetary gears joining the pinions revolve on their individual axes without operating the floating element 89. However, should there be any difference in speed between the pinions 90 the planetary gears 91 revolve around the axis of the pinions 90 carrying with them the floating member 89.

The floating member 89 of the planetary mechanism is in the nature of a ring and in the case illustrated it is provided on its exterior with helical teeth so that it forms a large worm wheel. It will be understood, of course, that the ring may be supported in any suitable manner to be freely rotatable concentric with the pinions. It is common to make the ring in the form of a case that houses the mechanism. The worm wheel 89 of the differential mechanism meshes with a worm gear or segment 92 having a pivotal axis 93. The segment 92 is rotated on its axis whenever the floating element 89 of the differential rotates. The direction in which the segment 92 is swung depends upon the direction of rotation of the element 89. Any suitable mechanical connection may be provided between the segment 92 and the throttle valve 85. A simple link connection 94 is shown connecting an extension of the segment 92 with the stem of the valve 85.

The electrical connection provided by my invention contemplates utilization of the alternating current generated by the generators G' so that any variation in speed of operation of the generators is immediately reflected in the operation of the synchronous motors causing operation of one of the throttle valves to correct the lack of synchronization.

In the form of the invention illustrated the generators G' operate to generate a three phase alternating current and the two synchronous motors 86 and 87 of each unit controlling a throttle valve are designed to be operated by the current from the generators so that the speed of any particular synchronous motor will correspond exactly with that of the generator with which it is connected.

The system of the present invention provides, generally, for an electrical system connecting the generators G' of the units and the synchronous motors connected with the throttles so that the two motors of one unit are energized from one generator G' while that generator energizes only one of the motors of the other unit, the second motor of said other unit being energized from the other generator G'. It will thus be apparent that if the two generators G' are not in synchronism the synchronous motors of the throttle valve for said other unit will not be in synchronism and as a result that throttle valve will be operated until the lack of synchronism is corrected. The system also provides suitable switches and a selecting means whereby the operator may elect to make either one of the generators G' the master to which the other is adjusted, and the operator may, at will, speed up or slow down the master generator to gain the desired electrical output from the system.

In Fig. 5 of the drawings I have illustrated a simplified diagram in which each single line represents the several conductors necessary for the three phase circuit. In the diagram, Fig. 5, the synchronous motor differential throttle control of the upper unit is illustrated at X and the synchronous motor differential throttle control of the lower unit is illustrated at Y. The master selector is illustrated at Z and the control switching means for varying the speed of the master generator is illustrated at S.

Current from the generator G' of the upper unit is carried by connection 100 to terminal 101 of the master selector Z. Current from generator G' of the lower unit is carried by connection 102 to the terminal 103 of the master selector. The control arm 104 of the master selector can be thrown into contact with either of the contacts 101 and 103. The control arm 104 connects with a connector 105 extending from the master selector to the synchronous motor 86 of the upper unit S and with connector 106 connecting with the synchronous motor 86 of the unit Y. A connection 110 connects the generator G' of unit X with synchronous motor 87 of that unit while a connection 111 connects the generator G' of unit Y with the synchronous motor 87 of unit Y.

When the control member 104 of the master selector Z is positioned to engage contact 101 as shown in the diagram, generator G' of unit X feeds the connections 105 and 106 so that the synchronous motors 86 of the two units are driven by and operate in synchronism with the generator G' of unit X. Synchronous motor 87 of unit X being connected with the generator G' of that unit by connection 110 operates at the same speed as motor 86 and therefore the unit X becomes a master or fixed unit.

It will be apparent that as the motors 86 and 87 at unit X operate at exactly the same speed because they are both energized from the common generator G' the differential mechanism of that unit will not operate to vary the throttle valve thereof. However, with the setting just described the synchronous motor 86 of unit Y is energized from generator G' of unit X while the synchronous motor 87 of unit Y is energized from the generator G' of unit Y through connection 111. The throttle mechanism of unit X is not varied while the generator of unit X is connected through the master selector Z because both synchronous motors of that unit are necessarily operating at the same speed. However, the synchronous motors of the unit Y being operated one from the generator of the unit X and the other from the generator of unit Y the differential of unit Y is subject to operation to regulate the throttle valve 85 of unit Y. If for any reason the generator G' of unit Y varies in speed from that of unit G there will be a difference in speed of operation between the synchronous motors 86 and 87 of unit Y. This variation in speed or lack of synchronism will be reflected through the differential mechanism 88 of unit Y to operate the throttle valve 85 in the appropriate direction to either speed up or slow down the motor driving generator G' of unit Y, as the case may be, until such time as synchronization is re-established.

It will be apparent that through the master selector Z either unit may be established as the master unit so that the other unit is adjusted relative thereto.

The control switching means S is provided primarily to provide a means whereby the speed of the control or master unit, as selected through the master selector Z, may be varied as desired. In practice one of the units having been selected as the master unit to which the other unit is made to synchronize, it may be desired to speed up or slow down the master unit in order to gain the desired electrical output.

The control switching means includes a series of reversing switches preferably under a single manual control. In the diagram I have indicated a series of reversing switches on a single operating rod 120 under control of an operating lever 121. The several switches involved in the means S are reversing switches there being a reversing switch 122 in connection 105, a reversing switch 123 in connection 110, a reversing switch 124 in connection 106 and a reversing switch 125 in connection 111. It will be noted that switches 122 and 123 connect with unit X whereas switches 124 and 125 connect with unit Y.

With the master selector Z set as shown in the diagram so that unit X is the master or control unit, the speed of operation of the generator G' of unit X can be varied only by obtaining a differential in the operation of the two synchronous motors driven by the generator G' of that unit. To accomplish this the reversing switches 122 and 123 are connected with the rod 120 so that when the operating member 121 is moved to the left switch 123 is reversed, causing motor 87 of unit X to be reversed, with the result that the throttle valve is immediately operated and will continue to operate in one direction, as for instance to open, so long as the control member 121 is held to the left. When the desired increase in speed has been obtained the lever 121 may be returned to the original position whereupon motor 87 is re-established at the same speed and in the same direction as motor 86, leaving the throttle valve in the position occupied when the lever 121 was returned to the original position. If it is desired to operate the control in the opposite manner, that is, to close the throttle valve, the control member 121 is moved to the right, causing an operation of switch 122 so that motor 86 of unit X is reversed. It is to be understood that when switch 123 is reversed, as above described, the switch 122 is unchanged, whereas when switch 122 is reversed switch 123 is unchanged. Reversal of motor 86 of unit X causes operation of the throttle valve through the differential mechanism until the desired position of the throttle has been obtained, whereupon return of the member 121 to the original position will leave the mechanism operating at the newly established speed.

The switches 124 and 125 being connected in a manner corresponding to switches 122 and 123 it will be apparent how unit Y can be controlled in the manner described with reference to unit X when unit Y is being employed as the master unit through proper setting of the master selector Z.

The throttling control hereinabove described is of the general type which is more fully described and which is claimed in my copending application filed on even date herewith, entitled Control system, Serial No. 459,412.

In carrying out the present invention it may be desired to employ generators involving D. C. exciters which require commutators. Since commutators may cause undesirable sparking in aircraft operated at high altitudes electrical devices equipped with commutators are preferably encased so that they operate at substantially constant pressure.

In practice it will usually be desired to connect the output of the several power generators G. I have provided the overrunning clutches J between each motor C and its generator G, so that as one generator is started before the other, or is running ahead of the other, it can feed into the other and cause it to operate as a motor until it is up to speed, at which time it will be in phase and function as a generator.

In the form of the invention illustrated in Fig. 3 I employ a pressure generator or pump A' of a positive displacement type which will deliver fluid under pressure at a rate depending upon the speed of operation of the engine B. With this type of pump or pressure generator it is impractical to attempt to regulate the delivery of fluid by controlling the amount of fluid supplied to the pump and, therefore, the regulation of the fluid is accomplished by control of the discharged fluid.

In the form of the invention illustrated in Fig. 3 the oil delivered by the pump A' after passing the cut-off means 20 and check valve 21, enters a pressure regulator or pressure relief device 70 which operates to allow fluid to pass to the oil supply line 12 at a predetermined pressure, any excess being discharged through the outlet 71 which connects with the supply line 11 so that it is returned either to the pump A' or to the reservoir 13. The pressure regulating device 70 may be of any suitable type, there being various devices of this character suitable for the purpose and well-known to those skilled in the art. The present invention is in no way concerned with the details of such elements of the system and, therefore, the details have been omitted from the drawings.

With the pressure regulator 70 receiving oil from the pump A' and controlling the pressure supplied to the supply line 12, it is unnecessary to provide an accumulator such as is illustrated in the form of the invention shown in Fig. 1. If desired, however, an accumulator could be incorporated in the system. If the accumulator is eliminated as shown in the drawings it may still be desirable to provide thermal control of the fluid passing through the supply line 12 to the motor C in which case a suitable thermal medium such as a heating or a cooling medium, as the circumstances require, may be circulated through a manifold 80 provided in connection with the supply line 12, the circulation of the thermal medium being controlled by a valve 81 regulated by a suitable thermostat 82.

Except for the difference in the manner of supplying fluid under pressure to the line 12 the system shown in Fig. 3 may correspond with that shown in Fig. 1. In Fig. 3 the elements of the system corresponding to those shown in Fig. 1 are numbered correspondingly. The operation of the system illustrated in Fig. 3 is substantially the same as that illustrated in Fig. 1, except for the manner in which the fluid pressure is generated and regulated. In the system shown in Fig. 3 the pump A' will deliver fluid under pressure at a rate depending upon the speed at which the engine B is operated. Sufficient fluid is passed by the pressure regulating valve 70 to maintain the desired pressure in the supply line 12. The excess is bled off or discharged into the supply line 11 for recirculation.

In practice a wobble plate type of pressure generator A² may be used as shown in Fig. 6 of the drawings. The usual wobble plate type of pump or pressure generator is positive in action and the volume of fluid delivered is governed by varying the position or angle of the wobble plate 10ᵃ. When using this type of pressure generator the control means will be connected to regulate the wobble plate and in such case it will not be running to regulate the supply to the generator as in Fig. 1 or to bleed off excess fluid under pressure as in the case shown in Fig. 3.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. In an electrical generating system of the character described, a source of power, an alternating current generator, a fluid motor connected with the generator for operating it, a fluid pressure generator connected with the source of power to be driven thereby, a fluid connection delivering fluid under pressure from the pressure generator to the motor, means for controlling the temperature of the fluid supplied to the motor, and a control for the fluid whereby it is delivered to the motor at a predetermined rate and pressure.

2. In an electrical generating system of the character described, a source of power, an alternating current generator, a fluid motor connected with the generator for operating it, a fluid pressure generator connected with the source of power to be driven thereby, a fluid connection delivering fluid under pressure from the pressure generator to the motor, means whereby the fluid under pressure is thermally regulated to enter the motor at a predetermined temperature, and a control for the fluid whereby it is delivered to the motor at a predetermined rate and pressure.

3. In an electrical generating system of the character described, a source of power, an alternating current generator, a fluid motor connected with the generator for operating it, a fluid pressure generator connected with the source of power to be driven thereby, a fluid connection delivering fluid under pressure from the pressure generator to the motor, a fluid supply means receiving fluid from the motor and supplying it to the pressure generator, and a control for the fluid whereby it is delivered to the motor at a predetermined rate and pressure, and means thermally controlling the fluid at the supply means and at said fluid connection whereby the temperature of the fluid is maintained substantially constant.

4. In an electrical generating system of the character described, a source of power, an alternating current generator, a fluid motor connected with the generator for operating it, a fluid pressure generator connected with the source of power to be driven thereby, a fluid connection delivering fluid under pressure from the pressure generator to the motor, and a control for the fluid whereby it is delivered to the motor at a predetermined rate and pressure, the control including means regulating the pressure of the fluid delivered by the pressure generator, an orifice fitting regulating the flow to the motor, and means maintaining a predetermined back pressure on the motor.

5. In an electrical generating system of the character described, a source of power, an alternating current generator, a fluid motor connected with the generator for operating it, a fluid pressure generator connected with the source of power to be driven thereby, a fluid connection delivering fluid under pressure from the pressure generator to the motor, a fluid supply means receiving fluid from the motor and supplying it to the pressure generator, and a control for the fluid whereby it is delivered to the motor at a predetermined rate and pressure, the control including means regulating the pressure of the fluid delivered by the pressure generator, a flow regulator in said connection immediately ahead of the motor, and a flow regulator between the motor and the fluid supply means.

6. An electrical generating system for use with a source of power having two engines including two generating units, one connected with each engine and each including, an electrical generator, a fluid motor for driving the generator, a fluid pump driven by the engine, and a fluid pressure connection carrying fluid from the pump to the motor and a return connection carrying fluid from the motor to the pump, and means interconnecting the units including a fluid connection between the pressure connections and a fluid connection between the return connections.

7. An electrical generating system for use with a source of power having two engines including two generating units, one connected with each engine and each including, an electrical generator, a fluid motor for driving the generator, a fluid pump driven by the engine, and a fluid pressure connection carrying fluid from the pump to the motor and a return connection carrying fluid from the motor to the pump, and means interconnecting the units including a fluid connection between the pressure connections and a fluid connection between the return connections, and means at each pump operable to close the pressure connection and the return connection at said pump upon failure of said pump to generate pressure.

8. An electrical generating system for operation by a source of power having two engines including two generating units, one connected with each engine and each including, an electrical generator, a fluid motor for driving the generator, a fluid pump driven by the engine, and a fluid pressure connection carrying fluid from the pump to the motor and a return connection carrying fluid from the motor to the pump, and means interconnecting the units including a fluid connection between the pressure connections and a fluid connection between the return connections, and means in the pressure connection to each motor operable to close said connection upon failure of the motor.

9. An electrical generating system for operation by a source of power having two engines including two generating units, one connected with each engine and each including, an electrical generator, a fluid motor for driving the generator, a fluid pump driven by the engine, and a fluid pressure connection carrying fluid from the pump to the motor and a return connection carrying fluid from the motor to the pump, and means interconnecting the units including a fluid connection between the pressure connections and a fluid connection between the return connections, and a means in connection with each motor and the fluid connection that is between the return connections whereby upon failure of the motor the fluid connection is closed to flow from the return of the other motor.

10. In an electrical generating system, two units each including an alternating current power generator, a power means for driving the power generator, an overrunning clutch drive between the power means and power generator, and a throttle for controlling operation of the power generator, the output of the power generators of the units being connected, and a control system for the units whereby one of them is regulated to operate in synchronism with the other including an alternating current control generator connected to operate with the power generator of the regulated unit, an alternating current control generator connected to operate with the power generator of the said other unit, a differential mechanism for operating the throttle of the regulated unit, and oppositely running synchronous motors operatively connected with the differential mechanism so the throttle is operated when the motors are out of synchronism, one motor being energized from one control generator and the other motor being energized from the other control generator.

11. In an electrical generating system, two units each including an alternating current power generator, a power means for driving the power generator, and a throttle for controlling operation of the power generator, and a control system for the units including, two oppositely operating synchronous motors at each unit, a differential mechanism for each unit operatively connected with the throttle thereof and driven by the motors thereof so the throttle is operated when the motors are out of synchronism, an alternating current control generator operating with the power generator of each unit, and means whereby the motors of one unit are both energized by the control generator of that unit while the motors of the other unit are energized one by the control generator of one unit and the other by the control generator of the other unit.

12. In an electrical generating system, two units each including an alternating current power generator, a power means for driving the power generator, and a throttle for controlling operation of the power generator, and a control system for the units including, two oppositely operating synchronous motors at each unit, a differential mechanism for each unit operatively connected with the throttle thereof and driven by the motors thereof so the throttle is operated when the motors are out of synchronism, an alternating current control generator operating with the power generator of each unit, and means whereby the motors of one unit are both energized by the control generator of that unit while the motors of the other unit are energized one by the control generator of one unit and the other by the control generator of the other unit, the said means including a selecting switch whereby either of the units may be established as the one having its motors energized by the same control generator.

13. In an electrical generating system, two units each including an alternating current power generator, a power means for driving the power generator, and a throttle for controlling operation of the power generator, and a control system for the units including, two oppositely operating synchronous motors at each unit, a differential mechanism for each unit operatively connected with the throttle thereof and driven by the motors thereof so the throttle is operated when the motors are out of synchronism, an alternating current control generator operating with the power generator of each unit, means whereby the motors of one unit are both energized by the control generator of that unit while the motors of the other unit are energized one by the control generator of one unit and the other by the control generator of the other unit, and regulating means for varying the operation of either of the motors of the unit in which the motors are energized by the same generator whereby the throttle of that unit can be operated to change the speed of operation of the power generator of that unit.

14. In an electrical generating system, two units each including an alternating current power generator, a power means for driving the power generator, and a throttle for controlling operation of the power generator, and a control system for the units including, two oppositely operating synchronous motors at each unit, a differential mechanism for each unit operatively connected with the throttle thereof and driven by the motors thereof so the throttle is operated when the motors are out of synchronism, an alternating current control generator operating with the power generator of each unit, and means whereby the motors of one unit are both energized by the control generator of that unit while the motors of the other unit are energized one by the control generator of one unit and the other by the control generator of the other unit, the said means including a selecting switch whereby either of the units may be established as the one having its motors energized by the same control generator, and regulating means for varying the operation of either of the motors of the unit in which the motors are energized by the same generator whereby the throttle of that unit can be operated to change the speed of operation of the power generator of that unit.

ARTHUR L. ARMENTROUT.